(12) United States Patent
Voights

(10) Patent No.: US 6,430,002 B1
(45) Date of Patent: Aug. 6, 2002

(54) DISK DRIVE WITH INTERLOCKING DISK CLAMP

(75) Inventor: Ronald L. Voights, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/968,973

(22) Filed: Oct. 1, 2001

Related U.S. Application Data

(62) Division of application No. 09/310,595, filed on May 12, 1999, now Pat. No. 6,304,412.

(51) Int. Cl.⁷ .............................................. G11B 17/038
(52) U.S. Cl. ................................. 360/99.12; 360/98.08
(58) Field of Search ......................... 360/98.08, 99.12; 369/270

(56) References Cited

U.S. PATENT DOCUMENTS

| | | | | |
|---|---|---|---|---|
| 4,918,545 A | * | 4/1990 | Scheffel .................. | 360/98.08 |
| 5,075,808 A | * | 12/1991 | Johnson .................. | 360/98.08 |
| 5,101,306 A | * | 3/1992 | Johnson .................. | 360/98.08 |
| 5,267,106 A | * | 11/1993 | Brue et al. ............... | 360/98.08 |
| 5,392,178 A | * | 2/1995 | Nishio et al. ............ | 360/99.08 |
| 5,426,548 A | * | 6/1995 | Fujii et al. .............. | 360/98.08 |
| 5,486,962 A | * | 1/1996 | Boutaghou ............... | 360/99.12 |
| 5,490,024 A | * | 2/1996 | Briggs et al. ............ | 360/99.12 |
| 5,517,374 A | * | 5/1996 | Katakura et al. ........ | 360/98.07 |
| 5,548,457 A | * | 8/1996 | Brooks et al. ........... | 360/98.08 |
| 5,592,349 A | * | 1/1997 | Morehouse et al. ..... | 360/98.08 |
| 5,663,851 A | | 9/1997 | Jeong et al. ............. | 360/98.08 |
| 5,694,269 A | * | 12/1997 | Lee ......................... | 360/98.08 |
| 5,712,746 A | * | 1/1998 | Moir et al. .............. | 360/98.08 |
| 5,790,345 A | * | 8/1998 | Alt .......................... | 360/98.08 |
| 5,790,346 A | * | 8/1998 | Fletcher .................. | 360/99.12 |
| 5,828,519 A | * | 10/1998 | Sasa ........................ | 360/99.12 |
| 5,847,900 A | * | 12/1998 | Iwabuchi ................. | 360/98.08 |
| 5,943,184 A | * | 8/1999 | Kelsic et al. ............ | 360/98.08 |
| 6,040,649 A | * | 3/2000 | Horng ..................... | 310/91 |
| 6,304,412 B1 | * | 10/2001 | Voights ................... | 360/98.08 |

FOREIGN PATENT DOCUMENTS

| | | | |
|---|---|---|---|
| EP | 0744744 A2 | | 11/1996 |
| EP | 0 744 744 A3 | * | 12/1997 |
| JP | 61-104366 | * | 5/1986 |
| JP | 8-335379 | * | 12/1996 |
| JP | 9-115216 | * | 5/1997 |

* cited by examiner

Primary Examiner—William Klimowicz
(74) Attorney, Agent, or Firm—Marsh Fischmann & Breyfogle LLP

(57) ABSTRACT

A disk drive apparatus is which includes an improved disk clamp/drive spindle interface. Axial positioning of the disk clamp on the drive spindle is restrainably maintained so that an outer peripheral surface of the disk clamp applies a clamping force to one or more storage disks. In one embodiment, the top end of a drive spindle is provided with a plurality of outwardly extending tabs. Correspondingly, a disk clamp is provided with a plurality of tabs which extend inwardly at a central aperture. The disk clamp tabs and drive spindle tabs are provided so that the disk clamp may be axially advanced about the drive spindle during assembly with the disk clamp tabs passing between drive spindle tabs. In conjunction with such assembly, the disk clamp may be deflected or bowed, toward the spindle center axis via the application of a loading force (e.g. by employing an assembly tool that deflects and maintains deflection of the disk clamp during assembly). When the disk clamp tabs have cleared the drive spindle tabs, the disk clamp is rotated and the loading force may be released, wherein a clamping force is applied to the storage disks by the disk clamp. In this regard, the disk clamp tabs are restrainably engaged by the drive spindle tabs at a predetermined axial location so as to maintain a predetermined degree of disk clamp deflection and corresponding resultant clamping force.

40 Claims, 4 Drawing Sheets

DISK DRIVE WITH INTERLOCKING DISK CLAMP

RELATED APPLICATIONS

This is a divisional patent application of U.S. patent application Ser. No. 09/310,595, filed May 12, 1999, now U.S. Pat. No. 6,304,412, hereby incorporated by reference in its entirety.

FIELD OF THE INVENTION

The present invention generally relates to disk drives employed in computer systems, and more particularly, to a disk drive arrangement that provides for the enhanced clamping of one or more storage disks to a disk drive spindle.

BACKGROUND OF THE INVENTION

Disk clamps are utilized in computer disk drives to maintain the desired positioning of one or more disks relative to a drive spindle. If disk slippage occurs after assembly, and particularly after the disks are formatted (e.g., after burn-in of servo tracks), the read/write capabilities of the system may be severely compromised.

As such, much attention has been directed to the provision of effective disk clamping assemblies. See e.g., U.S. Pat. No. 5,486,962 to Boutaghou; U.S. Pat. No. 5,490,024 to Briggs et al.; U.S. Pat. No. 5,517,374 to Katakura et al; U.S. Pat. No. 5,548,457 to Brooks et al; U.S. Pat. No. 5,592,349 to Morehouse et al; U.S. Pat. No. 5,663,851 to Jeong et al.; U.S. Pat. No. 5,694,269 to Lee; U.S. Pat. No. 5,712,746 to Moir et al; U.S. Pat No. 5,790,346 to Fletcher; U.S. Pat. No. 5,828,519 to Sasa; and U.S. Pat. No. 5,847,900 to Iwabuchi. As reflected by the art, several interrelated design considerations exist.

Of particular importance, it has been recognized that the localized provision of clamping forces to a disk clamp, and in turn to the clamped disks, may result in undesirable disk flatness distortion. As such, effective clamping assemblies should provide for the relatively uniform application of clamping forces. Relatedly, effective clamping assemblies should provide for a highly predictable clamping force. It has also been recognized that effective clamping assemblies should allow for ready assembly and provide consistent assembly positioning in large-scale production operations. For example, effective clamping assemblies should provide for precise and repeatable positioning of the clamped storage disks, both axially and in lateral orientation. Such positioning is important for accurate functioning of read/write heads.

In addition to the noted criteria, the present inventor has recognized a number of other design considerations that will become increasingly important as data storage capacity requirements per unit space continue to increase.

BRIEF SUMMARY OF THE INVENTION

Accordingly, a primary objective of the present invention is to provide a disk drive apparatus having a clamping arrangement that maintains disk flatness, provides reliable clamping forces, and may be readily employed in an assembly operation to afford repeatable disk positioning. Additional advantages may include one or more of the following:

improved disk resonance attenuation;
reduced disk drive servicing requirements;
reduced contaminant generation;
improved ease-of-assembly with low part count and inventory; and
convenient implementation into existing disk drive systems.

One or more of the above-noted objectives and advantages may be realized in the present invention by virtue of an inventive disk clamp/drive spindle arrangement. More particularly, a disk drive apparatus is provided that comprises a drive spindle and at least one axial-restraining member fixedly interconnected to the drive spindle about an outer periphery thereof. The axial restraining member(s) may be integrally defined with the outer periphery of the drive spindle and defined to arcuately extend around only a limited portion of a cylindrical drive spindle. The drive spindle extends through a central opening of one or more disks which are disposed about the drive spindle. The disk clamp includes a central aperture which is positionable over a top end of the drive spindle at a predetermined, axially-fixed location relative to the drive spindle and disk(s) so as to engage and provide a desired clamping force to the top disk. Such predetermined axial positioning and clamping force is maintained by a mechanical interface between the disk clamp and the axial restraining member(s).

In one aspect of the invention, the disk clamp includes a bottom side having an outer surface adapted for substantially uniform application of the clamping force to the top disk. In this regard, such outer clamping surface may be provided for engaging the top disk of a disk stack in a flush, face-to-face manner about clamping contact region (e.g. an annular region). The clamping surface of the disk clamp may be preferably configured for substantially continuous engagement with the top disk about a circular engagement region.

In another aspect of the present invention, the axial restraining member(s) is provided to project outwardly from the outer periphery of the drive spindle, thereby defining a corresponding lip. Such lip is disposed to restrainably engage an inner surface located on the top side of the disk clamp. In this regard, such inner, restrained surface may be defined by at least one or more projection(s) extending inwardly at the central aperture of the disk clamp. The projection(s) may be provided to arcuately extend around only a limited portion of the central aperture.

Preferably, a plurality of outwardly extending, axial restraining members are circumferentially spaced about and integrally defined with the outer periphery of the drive spindle, and a plurality of inwardly extending projections are spaced about the central aperture of the disk clamp, wherein one or more of the restraining members is engageable with at least one of the projections to maintain predetermined axial positioning of the disk clamp and attendant disk clamping forces. Most preferably, a plurality of axial restraining members are spaced about the drive spindle to allow for the passage of a corresponding plurality of inward disk clamp projections therebetween, thereby facilitating ready assembly/disassembly of the apparatus.

In a further related aspect of the present invention upon interconnection of the disk clamp and drive spindle the disk clamp may downwardly deflect, or bowed, between an outer bottom disk clamping surface engaging a top disk and an inner top disk clamp surface engaging the axial restraining member(s) provided about the drive spindle. Such deflection readily and reliably provides a desired clamping force upon clamping of the storage disk(s) to the drive spindle via the disk clamp. Preferably, the inner surface on the top side of the disk clamp engages a plurality of axial restraining member spaced about the circumference of the drive spindle, and the outer surface on the bottom side of the disk clamp engages the top storage disk about a continuous annular ring, with the disk clamp downwardly deflected, or bowed, therebetween (e.g. so as to define a shallow dish or ring configuration).

The disk clamp may assume a variety of cross-sectional configurations. By way of example, the disk clamp may be substantially flat, or plate-shaped, wherein the clamp may be deflected into a shallow disk or ring configuration upon assembly. In another arrangement, the disk clamp may be fabricated to define an upwardly-oriented, frusto-conical configuration prior to interconnection with the drive spindle.

In one arrangement, a disk drive is provided which includes a cylindrical drive spindle and a plurality of stacked disks disposed thereabout on a lower shelf of the drive spindle. One or more spacer members may be provided in the stack therebetween each storage disk. A plurality of axial restraining members are defined about a top end of the drive spindle by outwardly extending tabs which in turn define inwardly extending recesses therebetween. Such tabs may be integrally formed with the top end of the spindle. Correspondingly, a plurality of projections may be integrally defined at the central aperture of a circular disk clamp (e.g. plate-shaped) by inwardly extending tabs. Such tabs serve to define outwardly extending recesses therebetween. The plurality of tabs and recesses at the top end of the spindle and of the disk clamp, respectively, are sized and shaped so that the disk clamp may be positioned over the top end of the drive spindle and axially advanced with the application of an axially directed loading force so that the disk clamp tabs pass between and axially beyond the drive spindle tabs. The disk clamp may then be rotated about the top end of the spindle and the loading force released to establish restraining engagement between the spindle tabs and disk clamp tabs. As will be appreciated, the axial location of the tabs on the drive spindle disposes the central aperture of the disk clamp at a predetermined desired position. Correspondingly, the axial height of the top disk of the disk stack (i.e. relative to the drive spindle) serves to position the outer rim of the disk clamp at a predetermined position, wherein the disk clamp may deflect to a predetermined desired extent upon assembly to reliably provide a predetermined clamping force. Of note, such clamping may be established free from any connecting members (e.g. screws) extending between the disk clamp and top shelf of the drive spindle.

A ring of apertures may also be provided through the disk clamp for aligned positioning over a corresponding ring of holes provided on a top shelf of the spindle. Such apertures and holes may be aligned upon interconnection of the disk clamp and spindle to receive balance weights therethrough. The access apertures in the disk clamp may be provided in arcuately offset relation to the recesses defined about at the central aperture of the disk clamp.

One of the more above-noted objectives and advantages may also be realized by an inventive method for interconnecting, or clamping, one or more disks to a drive spindle in a disk drive apparatus. The inventive method comprises the initial step of disposing one or more disks about a drive spindle. Such step may include consecutively positioning a central opening of each disk in aligned relation with a drive spindle and axially advancing the disk into position (e.g. with a corresponding axial spacer between each stacked disk). The inventive method further includes positioning a disk clamp about the drive spindle and axially advancing the disk clamp relative to the drive spindle. A load force is applied to the disk clamp, wherein upon engagement between the disk clamp and a top storage disk a clamping force is applied by the disk clamp to the top disk. In order to maintain the application of such clamping force, the method further includes axially restraining the disk clamp via restraining engagement with one or more restraining members interconnected about the drive spindle. The axial restraining member(s) may be integrally defined with the outer periphery of the drive spindle and defined to arcuately extend around only a limited portion of a cylindrical drive spindle.

In conjunction with the application of a load force, the inventive method preferably comprises the step of deflecting the disk clamp. Such deflection may entail bowing a disk clamp from a substantially flat, or plate-like, configuration to a shallow dish or ring configuration. In another arrangement, application of a load force may entail the deflection of a disk clamp having an upwardly oriented, frusto-conical configuration prior to deflection. Loading forces may be advantageously provided by assembly tooling, wherein the tooling may axially restrain an outer rim of the disk clamp (e.g. about an outer annular ring-shaped region) while axially displacing a central region of the disk clamp surrounding the central aperture (e.g. about an inner annular ring-shaped version). The axial displacement causes the disk clamp to slightly deflect, or bow, from an inactive, unloaded state to an active, loaded state. Such deflection is preferably maintained solely by the assembly tooling during disk clamp positioning relative to the drive spindle. As such, an external loading force may be advantageously provided free from force transfer to other disk drive components (e.g. the drive spindle) during assembly operations. When the bowed disk clamp is in the desired position relative to the drive spindle, the assembly tooling may be adapted for selective release of the restraints on the outer rim and central region of the disk clamp, thereby loading the disk clamp in its deflected, or active state to the drive spindle and disk stack.

In conjunction with the axial restraint of the disk clamp (e.g. in the central region thereof), the inventive method may further comprise the step of rotating at least one of the drive spindle and disk clamp relative to the other. For example, the above-noted assembly tooling may rotate prior to release of the outer and inner axial restraint of the disk clamp. As will be appreciated, axial restraint of the disk clamp on the drive spindle may be achieved by aligning outwardly projecting tabs provided on the drive spindle with inwardly projecting tabs provided on the disk clamp, axial movement of the disk clamp is restrained by the drive spindle tabs after assembly.

Additional aspects and advantages of the present invention will become apparent upon consideration of the drawings and detailed description which follow.

DETAILED DESCRIPTION

Figure 1:
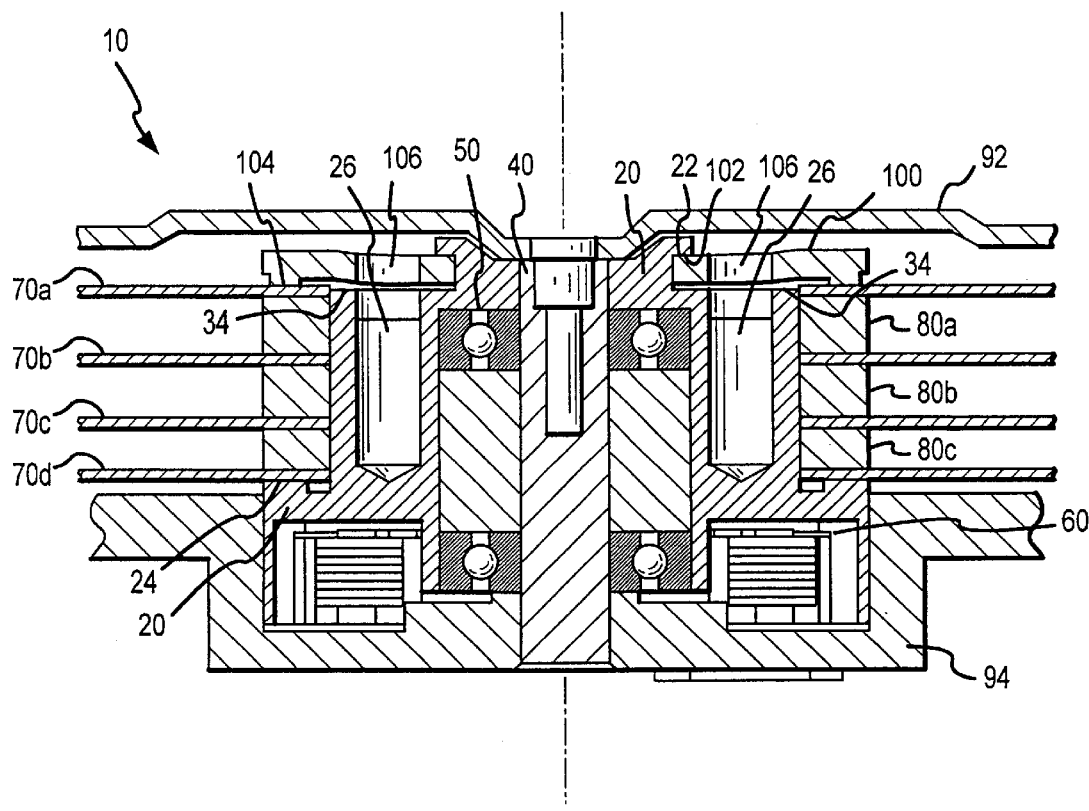
FIG. 1 is a cross-sectional view of one embodiment of a disk drive comprising the present invention.

FIG. 1 illustrates one embodiment of a disk drive 10 comprising the present invention. Disk drive 10 comprises a drive spindle 20 disposed about a central shaft 40 with a bearing assembly 50 interposed therebetween to facilitate driven rotation of spindle 20 relative to shaft 40. To provide for such drive rotation, a motor assembly 60 is disposed for operative interface with spindle 20.

A plurality of storage disks 70a–70d are disposed about spindle 20 in a stacked fashion on a lower shelf 24 of the spindle 20. Disks 70a–70d are axially spaced via spacer elements 80a–80c interposed therebetween. A disk clamp 100 is disposed about a top end of drive spindle 20 to cooperatively maintain storage disks 70a–70d in fixed relation to spindle 20, as will be further described. Disk clamp 100 may include a plurality of apertures 106 aligned with a common plurality of holes 26 provided in an upward facing top shelf 34 of spindle 20. Apertures 106 and holes 26 are provided for selective receipt of balancing weights.

A disk drive housing is defined by an upper housing member 92, and lower housing member 94. As illustrated, lower housing member 94 may include upped region shaped to receive motor assembly 60 and bottom portions of spindle 20 and bearing assembly 50. As will be appreciated, disk drive 10 will further comprise a number of additional conventional components, including for example, read/write heads mounted on corresponding arms with an actuator interface to facilitate selective positioning of the heads between storage disks 70a–70d for read/write operations.

As noted, spindle 20 and disk clamp 100 are disposed to provide an operative interface that yields enhanced clamping of the disks 70a–70d relative to spindle 20. In this regard, it can be seen that disk clamp 100 is axially restrained in a predetermined axial position relative to spindle 20 via a mechanical interface therebetween. More particularly, in the illustrated embodiment, it can be seen that a downward-facing lip surface 22 of spindle 20 is disposed to restrainably engage an upward-facing inner surface 102 of disk clamp 100. Relatedly, a downward-facing, outer surface 104 of disk clamp 100 is disposed to contact and apply a clamping force to the top surface of storage disk 70a. Such clamping force is communicated through the stack of disks 70a–70d and interposed spacers 80a–80c to the upward-facing ledge surface 24 of spindle 20.

The defined clamping arrangement yields a reliable, fixed interconnection between disks 70a–70d and spindle 20, while maintaining the desired flatness of disks 70a–70d. In this regard, it should be noted that disk clamp 100 is slightly deflected, or bowed, to a predetermined extent downwardly. Such deflection is maintained via the restrictive engagement between lip surface 22 of spindle 20 and upward-facing surface 102 of the disk clamp 100 at a predetermined axial location on the drive spindle 20. This predetermined axial location is provided in relation to the predetermined height, or axial location of the top of disk 70a (e.g. relative to drive spindle 20) so as to yield the desired degree of disk clamp 100 deflection upon assembly. In turn, the desired deflection of disk clamp 100 provides a predetermined, desired clamping force that is communicated to the top storage disk 70a via the downward-facing surface 104 of disk clamp 100.

Further in this regard, it should be noted that bottom surface 104 is disposed to provide for the uniform application of clamping forces to the top disk 70a. More particularly, and as shown FIG. 1, it can be seen that the bottom, outer surface of disk clamp 100 is provided for flush, face-to-face engagement with the top disk 70a. Further, the bottom surface 104 may be provided to extend continuously about spindle 20.

Figure 2:
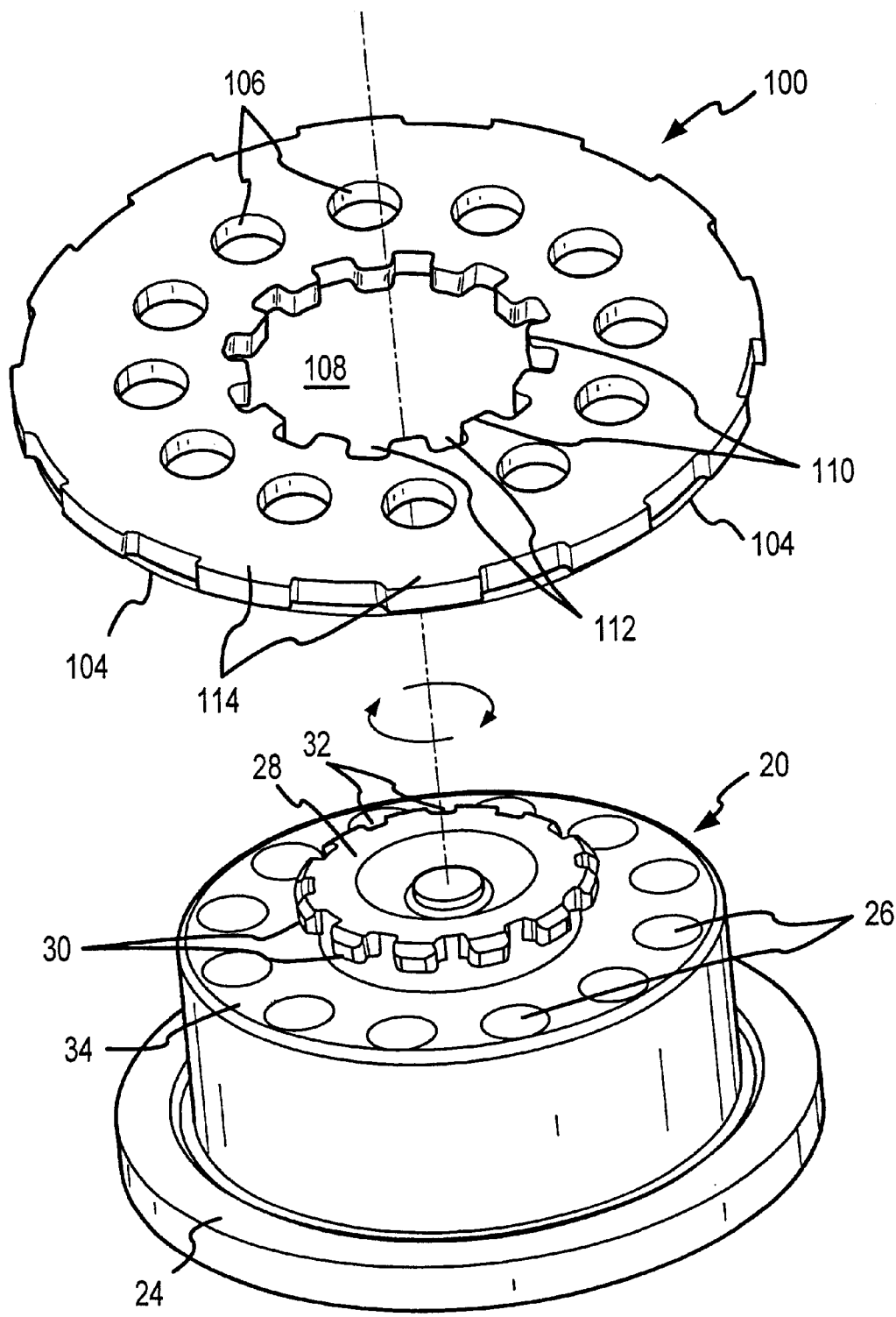
FIG. 2 is an exploded perspective view of a drive spindle/disk clamp embodiment employable with the disk drive embodiment of FIG. 1.

More particularly, and referring now to FIG. 2, an embodiment of disk clamp 100 and spindle 20 is illustrated. The illustrated disk clamp 100 is of a substantially flat, plate-like configuration, but may assume other configurations (e.g. an upward-oriented, frusto-conical configuration). Disk clamp 100 defines a continuous annular, or ring-shaped, bottom surface 104, and comprises a central aperture 108 shaped for positioning about a top end 28 of spindle 20. As shown, disk clamp 100 also includes a plurality of inwardly-projecting tabs 110 which define a plurality of outwardly-extending recesses 112 therebetween. Correspondingly, the top end 28 of spindle 20 comprises a plurality of outwardly-extending, integral tabs 30 which define a plurality of inwardly-extending recesses 32 therebetween. The size, number and spacing of recesses 112 in disk clamp 100 are provided in corresponding relation to the size, number and spacing of outwardly projecting tabs 30 of spindle 20. Similarly, the size, number and spacing of the inwardly projecting tabs 110 of spindle 100 are provided in corresponding relation to the size, number and spacing of the recesses 32 provided at the top end 28 of spindle 20. Such corresponding tabs/recesses allow for the ready establishment of an operative, clamping engagement therebetween and ready during assembly of the disk drive embodiment 10.

In particular, to establish the operative relationship, disk clamp 100 may be axially advanced over the top end 28 of spindle 20 via mating positioning and advancement of tabs 110 through recesses 32 and recesses 112 about tabs 30. When the tabs 110 of disk clamp 100 have been axially advanced past the tabs 30 of spindle 20, disk clamp 100 and/or the top end 28 of spindle 20 may be rotated so that a least a portion of the tabs 110 of disk clamp 100 are at least partially aligned with and can be restrainably engaged by tabs 30 of spindle 20. That is, in relation to the foregoing description of FIG. 1, lip surface 22 will be defined by the bottom or downward facing, surfaces of tabs 30 of spindle 20, and the upward facing surface 102 of disk clamp 100 will be defined by the top, or upward facing, surfaces of tabs 110.

As further shown in FIG. 2, an annular ring of apertures 106 may be provided in disk clamp 100, and a corresponding annular ring of bore holes 26 may be provided on a top shelf 34 of spindle 20. As previously noted, such apertures 106 and bore holes 26 may be provided for the selective receipt of balancing weights. In this regard, it is noted that the apertures 106 may be positioned in offset arcuate relation relative to the recesses 112 of disk clamp 100. Such an arrangement locates the apertures 106 outside of high stress regions that may be defined between tabs 110 and the periphery of disk clamp 100 upon assembly.

Figure 3:
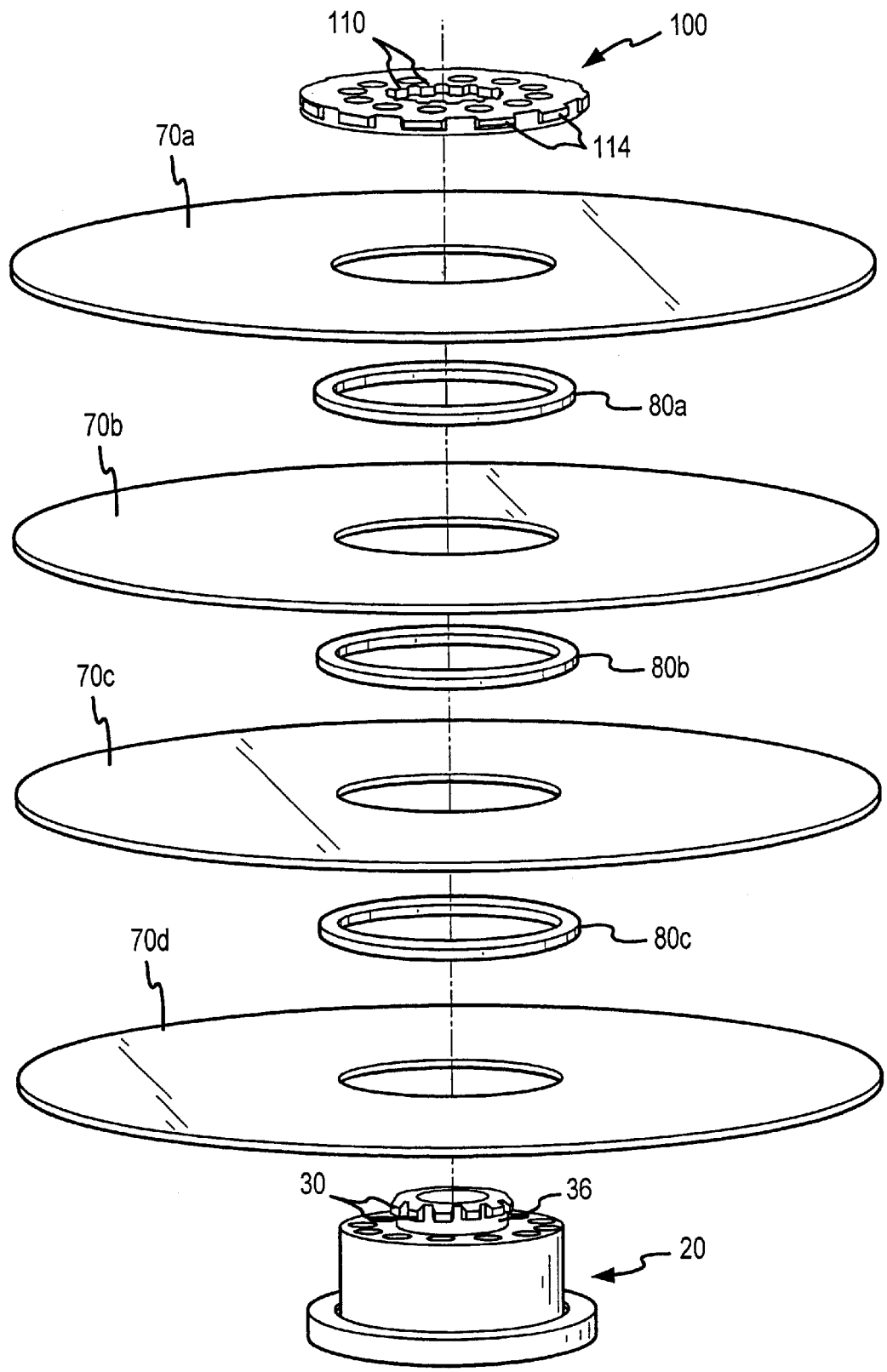
FIG. 3 is an exploded assembly view of the disk clamp/drive spindle embodiment of FIG. 2 with a plurality of exemplary storage disks and interposed spacers.

FIG. 3 illustrates how the spindle 20 and disk clamp 100 shown in FIG. 2 may be implemented in the disk drive arrangement shown in FIG. 1. In particular, following positioning of spindle 20 within the lower housing 94 (not shown in FIG. 3), disk 70d, spacer 80c, disk 70c, spacer 80b, disk 70b, spacer 80a, and disk 70a may be sequentially aligned and axially advanced for positioning about the top end 28 of spindle 20 as noted above. Thereafter, tabs 110 and recesses 112 of disk clamp 100 may be oriented and axially advanced relative to the recesses 32 and tabs 30, respectively, at the top end of spindle 20, so that tabs 110 will pass through recesses 32. In this regard, it should be noted that disk clamp 100 may be in a deflected, or bowed, state when positioned relative to drive spindle 20. Such deflection may be achieved via the application of an external loading force.

Figure 4:
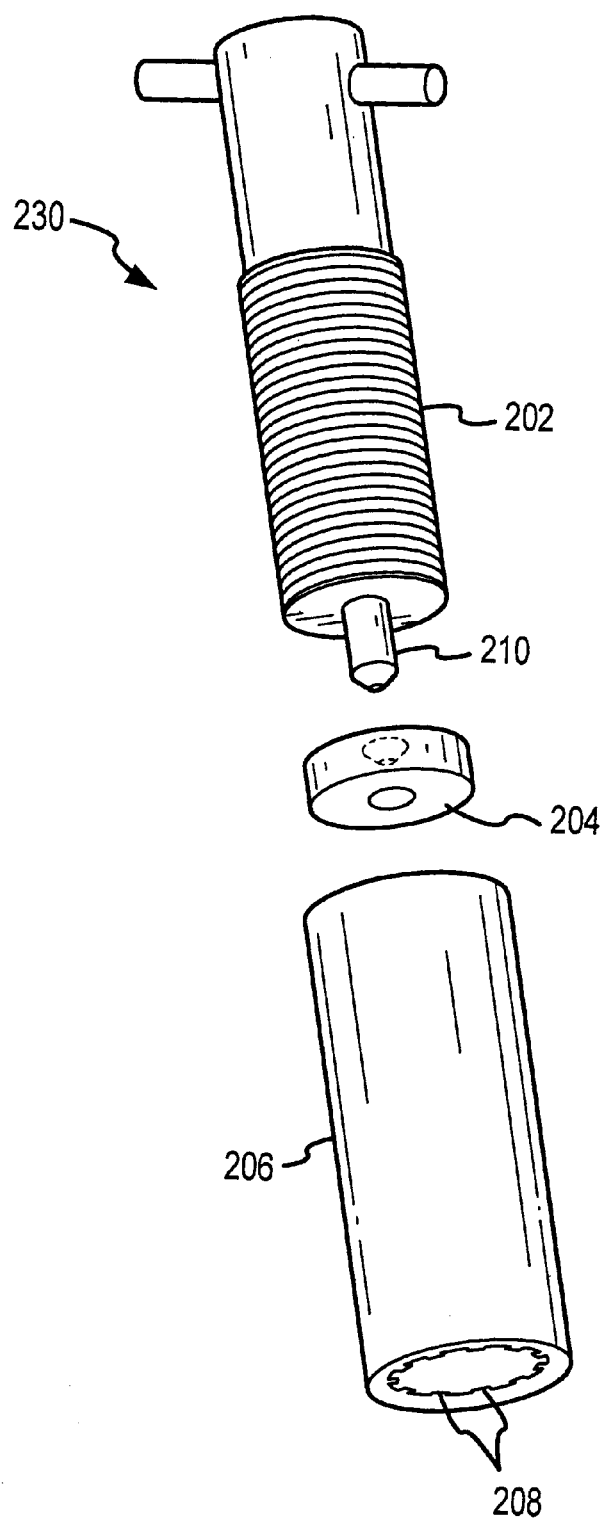
FIG. 4 is an exploded assembly view of an assembly tooling embodiment employable for deflecting and positioning the disk clamp embodiment of FIG. 2 relative to the drive spindle embodiment of FIG. 1.

By way of example, FIG. 4 illustrates one embodiment of an assembly tool 200 that may be utilized to provide the external loading force. While the assembly tool 200 is of a prototype configuration, it should be apparent that the tool may be readily adapted for use in large-scale production operations.

As shown in FIG. 4, the assembly tool 200 includes a cylindrical plunger 202, an insert ring 204 and a cylindrical, mandrel 206 of tubular construction. The plunger 202 may be externally threaded along at least a portion thereof. Correspondingly, mandrel 206 may be internally threaded along at least a portion thereof, wherein the plunger may be received by the mandrel 206 for threaded engagement therebetween. Insert ring 204 may be sized for slidable passage within mandrel 206. The bottom end of mandrel 206 may include a plurality of inwardly projecting tabs 208 that are sized and spaced to interface with outwardly projecting tabs 114 that may be provided about the periphery of disk clamp 100. As shown in FIGS. 2 and 3, tabs 114 may be of a thickness that is less than the thickness of the adjoining, rim portion of disk clamp 100, so as to provide for the positioning of the mandrel tabs 208 thereunder, as will be further described.

To achieve deflection of a disk clamp 100 using the assembly tool 200, the disk clamp 100 may be positioned within the bottom of mandrel 206. In this regard, outwardly projecting tabs 114 of the disk clamp 100 and inwardly projecting mandrel tabs 208 may be of a corresponding size, number and spacing so as to allow the disk clamp tabs 114 to pass between the mandrel tabs 208. After the disk clamp is positioned within the bottom end of mandrel 206, the disk clamp 100 may be slightly rotated so that the mandrel tabs 208 engage the disk clamp tabs 114 to retain the disk clamp 100 with the mandrel 206. The plunger 202 may then be threadably advanced within mandrel 206, with the insert ring 204 being positioned forward of the advancing end of plunger 202 within mandrel 206 for engagement with the top of disk clamp 100. As plunger 202 is advanced, a nose portion 210 of insert ring 204 will pass through the central aperture 108 of disk clamp 100 and the ring 204 will deflect the central region of disk clamp 100. In this regard, axial movement at the outer rim of the disk clamp 100 will be restrained via the outer contact engagement between tabs 208 of the mandrel 206 and tabs 114 of the disk clamp 100. As plunger 202 is rotated relative to mandrel 206, ring 204 will act upon an annular ring-shaped version of disk clamp 100 to deflect, or bow, clamp 100 to a predetermined degree. Such degree may be established by limiting the extent to which plunger may be advanced within mandrel 206. It will be appreciated that the deflection, or bowing, of disk clamp 100 will cause the disk clamp 100 to go from an inactive, unloaded state to an active, loaded state. As such, the predetermined degree of deflection may be selected to correspond with a predetermined clamping force to be applied by disk clamp 100 to the storage disks upon assembly. Correspondingly, it is also be noted that it may be preferable that the degree of the loading force created bear a linear relationship with the extent of axial displacement of the center region of disk clamp 100.

When the disk clamp 100 has been axially advanced to a position where tabs 110 are axially displaced from tabs 32 (e.g. adjacent to the cylindrical region 36 of spindle 20 shown in FIG. 3), disk clamp 100 may be slightly rotated so that tabs 110 of the disk clamp 100 are positioned below and preferably in aligned relation to restraining tabs 30 of the spindle 20. At this point, the external loading applied to disk clamp 100 for assembly may be released.

In this regard, if the tooling assembly 200 of FIG. 4 is employed, axial advancement for the desired positioning of the disk clamp 110 on drive spindle 20 may be facilitated by stop contact between nose portion 210 of insert ring 20A and the top of the disk drive shaft 40 or a stop plate connected thereto. When such axial positioning is established, the release of the loading force may be affected by simply retracting plunger 202 relative to mandrel 206 (i.e. by rotating plunger 202 to "unscrew" plunger 202 from mandrel 206). Correspondingly, mandrel 206 may be slightly rotated relative to disk clamp 100 so that tabs 208 on mandrel 206 are offset from the tabs 114 of disk clamp 100. To facilitate such rotation, mandrel tabs 208 may be of a thickness that is less than the thickness of the outer rim portion of disk clamp 100 adjoining tabs 114. Preferably, the combined thickness of a disk clamp tab 114 and a mandrel tab 208 will be no greater than the thickness of the outer rim portion of disk clamp 100 that adjoins tabs 114.

Upon release of the loading force, tabs 110 of the disk clamp 100 will be restrainably engaged at a predetermined axial location relative to spindle 20 by tabs 30 on the spindle 20. Such restraining engagement will maintain a desired, predetermined degree of deflection of the disk clamp 100, thereby providing for the application of a reliable clamping force to disks 70a–70d. Of note, such clamping force will be oriented substantially downwardly (e.g. about an annular ring with the clamping force vectors being substantially parallel to the drive spindle 20 center axis), free from any radial force components. In this regard, it is again noted that the bottom surface 104 of the disk clamp 100 may preferably contact the top of the disk 70a in a manner that provides for the substantially uniform application of clamping forces thereto. In particular, the bottom surface 104 may be provided to define a continuous, annular ring for flush contact with the top disk 70a. As shown in FIG. 1, to enhance axial delivery of the clamping force, the bottom surface 104 may be defined by a downward facing ring projecting from the bottom of disk clamp 100.

Spindle 20 and disk clamp 100 may be fabricated from a variety of materials, including for example aluminum or stainless steel. In this regard, disk clamp 100 may preferably comprise a material having sufficient stiffness (e.g. a shear modulus greater than 30 psi), so as to be capable of delivering a clamping force of about 500 psi to the stack of disks 70a–70d. In one such an arrangement, in order to realize a 500 psi clamping force, an aluminum disk clamp 100 may be deflected about 40 ml upon assembly (e.g. as measured by the axial displacement of edge of central aperture 108 relative to the outer rim of disk clamp 100).

The foregoing embodiments have been presented for purposes of illustration and description. Such embodiments are not intended to be exhaustive or to limit the invention to the precise form disclosed, and numerous modifications and variations may be possible in light of the above teachings. For example, it should be appreciated that aspects of the present invention may be readily adapted for implementation into existing disk drive assemblies. In such embodiments, the top end of existing drive spindles may be reworked or otherwise provided with an attachment that defines an outer periphery having tabs as described in the above-noted embodiments. It is intended that the appended claims be construed to encompass all such embodiments and other alternative embodiments of the invention except insofar as may be limited by the prior art.

What is claimed is:

1. A method for clamping at least one storage disk relative to a drive spindle in a computer disk drive, comprising:

disposing at least one storage disk about a drive spindle;

positioning a disk clamp about said drive spindle, wherein an outwardly projecting axial restraining member on said drive spindle is in axial alignment with a recess extending outwardly from a central aperture of said disk clamp;

advancing said disk clamp axially to an axial location relative to said drive spindle, wherein said axial restraining member passes through said recess;

applying a loading force to said disk clamp; and restraining said disk clamp at said axial location relative to said drive spindle by said at least one outwardly projecting axial restraining member, wherein a predetermined clamping force is applied to a top side of said at least one storage disk.

2. A method as recited in claim 1, wherein said applying step comprises:

deflecting said disk clamp from an inactive, unloaded state to an activated loaded state.

3. A method as recited in claim 2, wherein said deflecting step comprises:

displacing a central portion of said disk clamp in a first axial direction; and restricting an outer rim of said disk clamp from axial movement in said first direction during said displacing step.

4. A method as recited in claim 3, wherein said disk clamp is maintained in said loaded, activated state during at least a portion of said positioning step.

5. A method as recited in claim 4, wherein said restraining step comprises:

rotating at least one of said disk clamp and drive spindle, wherein said outwardly projecting axial restraining member of said drive spindle is axially aligned with an inwardly extending projection at said central aperture of said disk clamp.

6. A method as recited in claim 5, wherein said displacing, restricting and rotating steps are completed with said disk clamp supported within an assembly tool, and wherein said loading force and resultant disk clamp deflection forces are applied solely by and to the assembly tool during displacing, restricting and rotating steps.

7. A method as recited in claim 4, further comprising:

terminating said displacing and restricting steps, wherein said disk clamp engages said outwardly extending axial restraining member and a top side of said at least one storage disk in said loaded, activated state.

8. A method as recited in claim 1, wherein said positioning step further comprises:

aligning a plurality of spaced, outwardly projecting, axial restraining members interconnected about an outer periphery of said drive spindle with a plurality of correspondingly-spaced recesses extending outwardly from said central aperture of said disk clamp, wherein said outwardly projecting recesses define a plurality of inwardly extending projections therebetween.

9. A method as recited in claim 8, wherein said advancing step further comprises:

passing each one of said plurality of axial restraining members through a different one of said plurality of recesses.

10. A method as recited in claim 9, wherein said restraining step further comprises:

rotating at least one of said disk clamp and drive spindle, wherein each one of said plurality of axial restraining members is axially aligned with a different one of said inwardly extending projections of said disk clamp.

11. A method as recited in claim 1, wherein said restraining step further comprises:

rotating at least one of said disk clamp and said drive spindle, wherein a lip formed by a bottom surface of said outwardly projecting axial restraining member of said drive spindle restrainably engages a top surface of at least one inwardly extending projection at said central aperture of said disk clamp.

12. A method as recited in claim 11, wherein said advancing step further comprises:

passing said outwardly projecting axial restraining member axially beyond said recess such that a bottom surface of said outwardly projecting axial restraining member is advanced beyond a top surface of said disk clamp.

13. A method for clamping at least one storage disk relative to a drive spindle in a computer disk drive, comprising:

disposing at least one storage disk about a drive spindle;

positioning a disk clamp about said drive spindle and axially advancing said disk clamp to an axial location relative to said drive spindle;

applying a loading force to said disk clamp;

rotating said disk clamp relative to said drive spindle such that at least one outwardly projecting axial restraining member fixedly interconnected about an outer periphery of said drive spindle axially restrains at least one inwardly extending projection at a central aperture of said disk clamp, wherein a predetermined clamping force is applied to a top side of said one at least one storage disk.

14. A method as recited in claim 13, wherein said applying step comprises:

deflecting said disk clamp from an inactive, unloaded state to an activated, loaded state.

15. A method as recited in claim 14, wherein said deflecting step comprises:

displacing a central portion of the disk clamp in a first axial direction; and restraining an outer rim of the disk clamp from axial movement in said first direction during said displacing step.

16. A method as recited in claim 15, wherein the disk clamp is maintained in said loaded, activated state during at least a portion of said positioning step.

17. A method as recited in claim 16, wherein said positioning step comprises:

aligning said disk clamp and said drive spindle, wherein at least one outwardly extending recess provided at said central aperture of said disk clamp is axially aligned with said at least one axial restraining member fixedly interconnected to the outer periphery of said drive spindle, and wherein said at least one axial restraining member passes through said recess.

18. A method as recited in claim 17, wherein said displacing, restraining and rotating steps are completed with said disk clamp supported within an assembly tool, and wherein said loading force and resultant disk clamp deflection forces are applied solely by and to the assembly tool during said displacing, retraining and rotating steps.

19. A method as recited in claim 16, further comprising:

terminating said displacing and restraining steps, wherein said disk clamp engages said at least one outwardly extending axial restraining member and a top side of said at least one storage disk in said loaded, activated state.

20. A method as recited in claim 13, wherein said positioning step comprises:

aligning said disk clamp and said drive spindle, wherein a plurality of spaced, outwardly extending recesses provided at a central aperture of said disk clamp are axially aligned with a plurality of correspondingly spaced outwardly extending axial restraining members fixedly interconnected to the outer periphery of said drive spindle.

21. A method as recited in claim 20, wherein said positioning step further comprises:

passing each one of said plurality of axial restraining members through a different one of said plurality of recesses.

22. A method as recited in claim 13, wherein said positioning step further comprises:

advancing said at least one outwardly projecting axial restraining member axially so that a bottom surface thereof is advanced beyond a top surface of said disk clamp prior to said rotating step.

23. A method for clamping at least one storage disk relative to a drive spindle in a computer disk drive, comprising:
- disposing at least one storage disk about a drive spindle and an axial restraining member interconnected to and extending outwardly from a periphery of said drive spindle, said at least one storage disk having a central opening with a minimum cross-dimension that is greater than a maximum cross-dimension of said interconnected axial restraining member;
- positioning a disk clamp about the drive spindle and said interconnected axial restraining member and axially advancing the disk clamp to an axial location relative to the drive spindle and said interconnected axial restraining member;
- applying a loading force to the disk clamp; and,
- restraining the disk clamp at said axial location relative to said drive spindle and said interconnected axial restraining member, wherein a predetermined clamping force is applied to a top side of said at least one storage disk.

24. A method as recited in claim 23, wherein said positioning step comprises:
- passing said axial restraining member through a recess extending outwardly from a central aperture of said disk clamp.

25. A method as recited in claim 24, wherein said restraining step comprises:
- rotating at least one of said disk clamp and said drive spindle, wherein said outwardly projecting axial restraining member of said drive member is axially aligned with an inwardly extending projection at said central aperture of said clamp.

26. A method as recited in claim 23, wherein said applying step comprises:
- deflecting said disk clamp from an inactive, unloaded state to an activated loaded state.

27. A method as recited in claim 26, wherein said deflecting step comprises:
- displacing a central portion of said disk clamp in a first axial direction; and
- restricting an outer rim of said disk clamp from axial movement in said first direction during said displacing step.

28. A method as recited in claim 27, wherein said disk clamp is maintained in said loaded, activated state during at least a portion of said positioning step.

29. A method as recited in claim 28, wherein said displacing and restricting steps are completed with said disk clamp supported within an assembly tool, and wherein said loading force and resultant disk clamp deflection forces are applied solely by and to the assembly tool during displacing and restricting steps.

30. A method as recited in claim 23, wherein said restraining step comprises:
- rotating at least one of said disk clamp and said drive spindle, wherein said outwardly projecting axial restraining member of said drive spindle is axially aligned with an inwardly extending projection at said central aperture of said disk clamp.

31. A method for one of disassembly and disassembly/reassembly of at least one storage disk disposed about and clamped relative to a drive spindle of a computer disk drive, comprising:
- aligning a recess extending outwardly from a central aperture of a disk clamp with an outwardly extending axial restraining member interconnected to said drive spindle,
- first retracting said disk clamp relative to said drive spindle and said outwardly extending axial restraining member until said disk clamp is free of said drive spindle, wherein said axial restraining member passes through said recess; and
- second retracting said at least one storage disk relative to said drive spindle until said at least one storage disk is free of said drive spindle.

32. The method of claim 31, wherein said aligning step comprises:
- rotating said disk clamp from a first position to a second position.

33. The method of claim 32 wherein said rotating substep comprises:
- applying an axial loading force to said disk clamp.

34. The method of claim 33, wherein said applying substep comprises:
- releasing a predetermined clamping force applied by said disk clamp to said at least one storage disk.

35. The method of claim 31, wherein said first retracting step further comprises:
- aligning a plurality of recesses extending outwardly from said central aperture of said disk clamp with a corresponding plurality of axial restraining members interconnected to said spindle, wherein each of said plurality of axial restraining members passes through a corresponding one of said plurality of recesses during said first retracting step.

36. The method of claim 31, wherein said at least one storage disk has a central opening with a minimum cross-dimension that is greater than the maximum cross-dimension of said axial restraining member.

37. The method of claim 31, further comprising the steps of:
- servicing said disk drive after said first and second retracting steps; and
- reassembling said disk drive.

38. The method of claim 37, wherein said reassembling step comprises:
- disposing at least one storage disk about said drive spindle;
- positioning said disk clamp relative to said drive spindle, wherein said at least one recess extending outwardly from a central aperture of said disk clamp is aligned with said at least one outwardly extending axial restraining member interconnected to said drive spindle;
- advancing said disk clamp to an axial location relative to said drive spindle and said outwardly extending axial restraining member; and
- applying an axial loading force to said disk clamp; and
- restraining said disk clamp at said axial location by said at least one outwardly extending axial restraining member, wherein said disk clamp applies a predetermined clamping force to the top side of said at least one storage disk.

39. The method of claim 38, wherein said advancing step further comprises:
- passing said at least one outwardly extending axial restraining member through said at least one recess of said disk clamp.

40. The method of claim 38, wherein said restraining step further comprises:
- rotating said disk clamp from a first position to a second position relative to said drive spindle; and
- releasing said axial loading force.

\* \* \* \* \*